(No Model.) 2 Sheets—Sheet 1.
J. HARPER.
CAR COUPLING.
No. 541,748. Patented June 25, 1895.
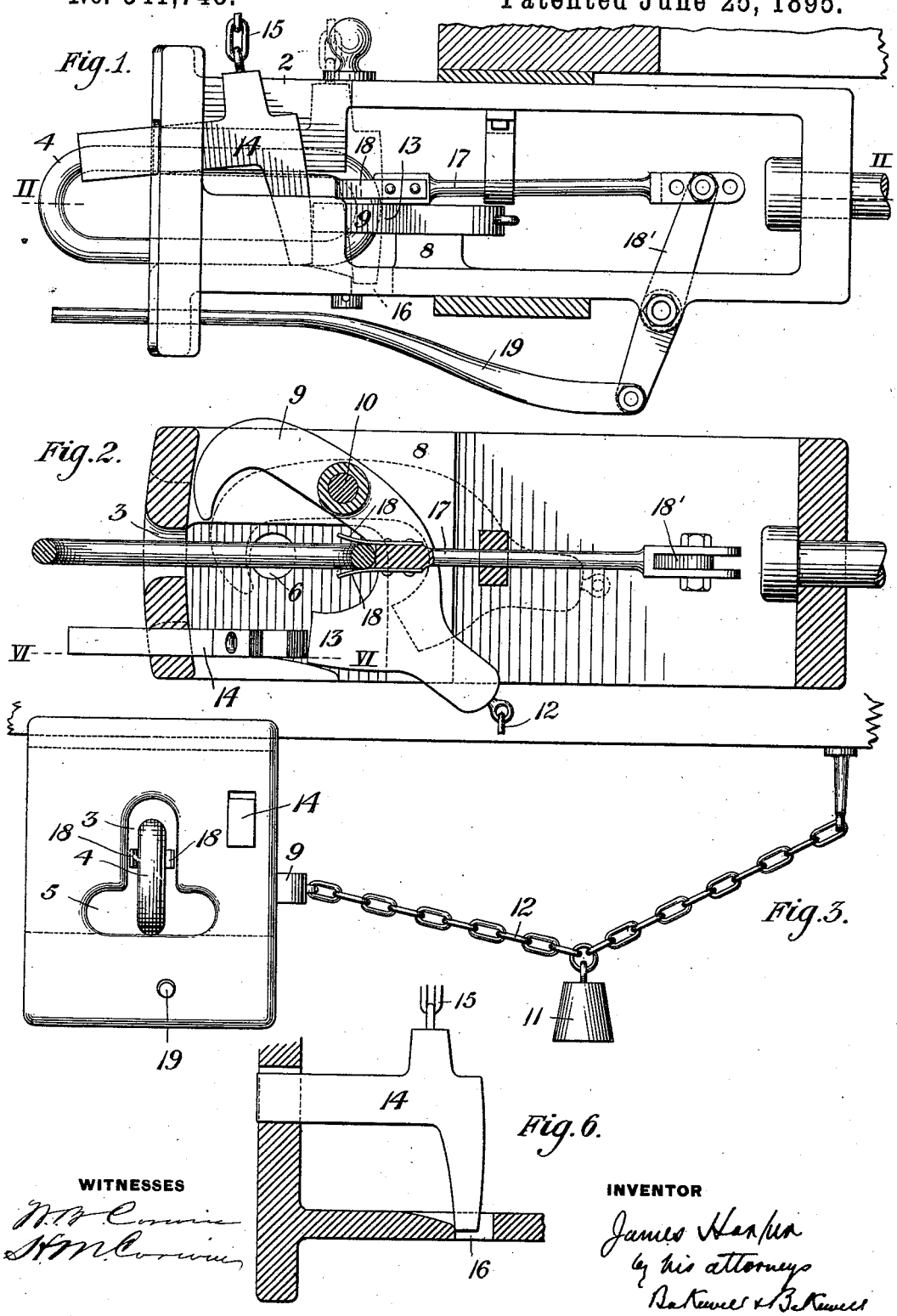
WITNESSES
INVENTOR
James Harper
by his attorneys
Bakewell & Bakewell (No Model.) 2 Sheets—Sheet 2.
J. HARPER.
CAR COUPLING.
No. 541,748. Patented June 25, 1895.
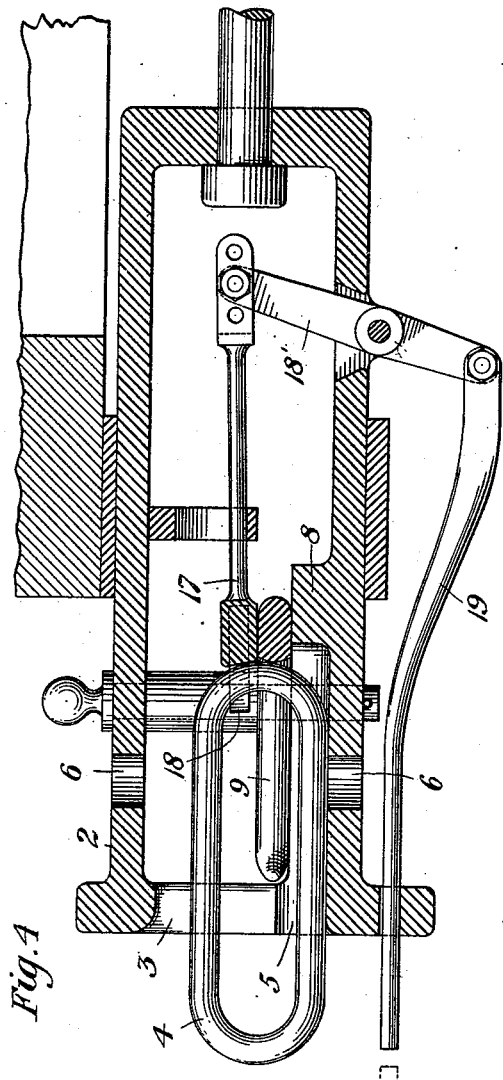
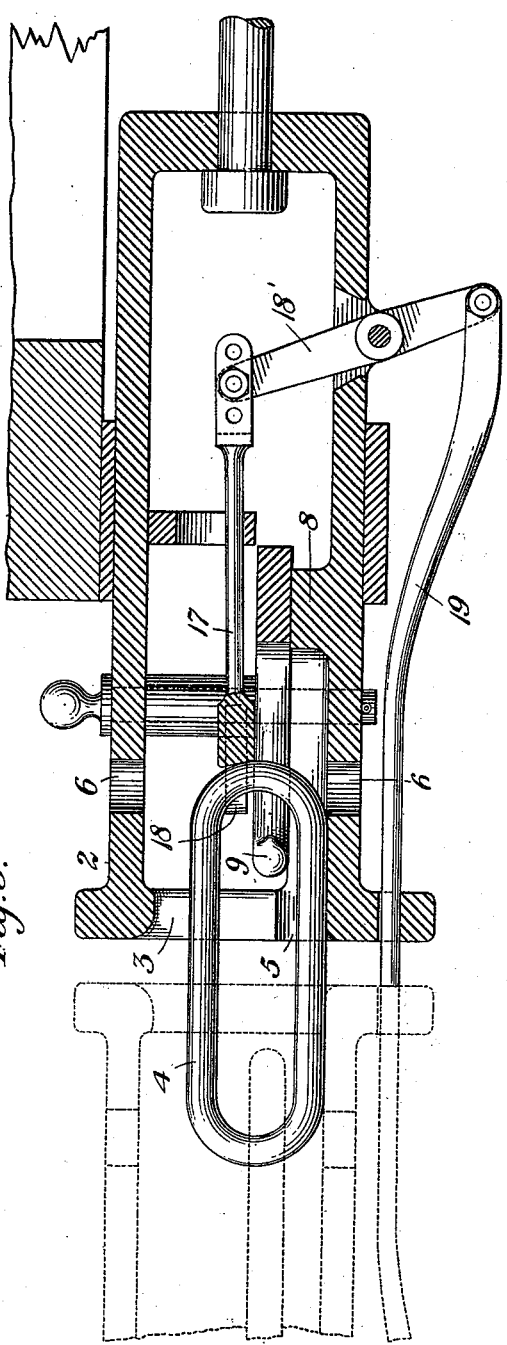
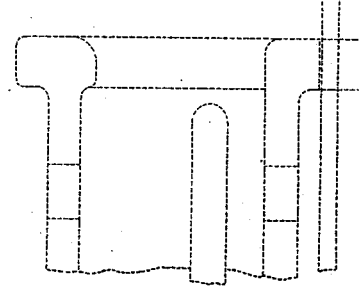
WITNESSES
INVENTOR
James Harper
by his attorneys
Bakewell & Bakewell

UNITED STATES PATENT OFFICE.

JAMES HARPER, OF CANNONSBURG, PENNSYLVANIA.

CAR-COUPLING.

SPECIFICATION forming part of Letters Patent No. 541,748, dated June 25, 1895.

Application filed April 18, 1895. Serial No. 546,229. (No model.)

*To all whom it may concern:*

Be it known that I, JAMES HARPER, of Cannonsburg, in the county of Washington and State of Pennsylvania, have invented a new and useful Improvement in Car-Couplers, of which the following is a full, clear, and exact description, reference being had to the accompanying drawings, forming part of this specification, in which—

Figure 1 is a side elevation of my improved coupler. Fig. 2 is a horizontal section on the line II II of Fig. 1. Fig. 3 is an end view showing the counterweight attachment. Figs. 4 and 5 are longitudinal sectional views of the coupling in different positions. Fig. 6 is a section on the line VI VI of Fig. 2.

My invention relates to the class of hook and link couplings, and is designed to afford a cheap, simple and effective device of this character.

In the drawings, 2 represents a draw-head, having in its front end a vertical slot 3 for the link 4, this slot leading into a horizontal slot 5, which may be used when coupling to an ordinary drawhead, a vertical hole 6 being provided for the usual coupling-pin in such case. To the floor of the head is secured a block or plate 8, to which is pivoted a hook 9, which swings horizontally upon a pivot-pin 10, and is normally held in retracted position by a weight 11 secured to a flexible connection 12 between the hook-shank and the floor of the car. A spring may be used in place of the weighted chain if desired. The shank of the hook is provided with a forwardly extending projection 13, against which presses the rear end of a locking-dog 14, the front arm of which projects through the front end of the drawhead at one side of the link and is contacted with by the face of the opposite drawhead. To the upper part of the dog is attached the operating chain 15, and the downwardly projecting rear arm of the dog is adapted to register with and drop into a hole 16 in the floor of the drawhead, when the dog is forced back into its rear position by the pressure of the opposing drawhead upon its front arm, as shown in dotted lines in Fig. 1. As the dog is forced back, it swings the hook into locking position and then locks it therein by dropping into the hole in the floor of the drawhead.

To hold the link in proper position and to move it forward into the opposing drawhead as the two couplers come together, I provide the pusher 17, which is provided at its front end with flaring springs 18 arranged to embrace the link, while to its rear end is pivoted the lever 18' fulcrumed in the drawhead and connected at its lower end to the buffer-rod 19, which projects forwardly from the drawhead and abuts against the opposite drawhead.

The action is apparent. A link being inserted in one drawhead, as the cars come together the buffer-rod of the coupler containing the link pushes it forward into the opposing drawhead, and the dogs being forced back swing the hooks into position and lock them therein. To uncouple, one of the dogs is lifted by its chain, and the weight or spring attached to the hook swings it into unlocking position and the dog moves forward, being supported by the floor of the head.

The advantages of my invention result from the positive action of all the parts, the simplicity and cheapness of the device, and its non-liability to get out of order.

Many changes in the form, construction and arrangement of the parts may be made by the skilled mechanic without departure from my invention; since

What I claim is—

1. The combination with a draw-head, of a pivoted hook arranged to engage the link, and a locking-dog engaging the hook and having a projection arranged to contact with the opposite draw-head; substantially as described.

2. The combination with a draw-head having a vertical slot, of a horizontally-swinging hook arranged to engage the link, a sliding dog arranged to swing the hook, and a recess into which the dog drops when in its rear position; substantially as described.

3. The combination with a draw-head having a vertical slot, of a horizontally-swinging hook arranged to engage the link, a sliding dog arranged to swing the hook and having a front extension projecting beyond the drawhead, and a recess into which the dog drops when in its rear position; substantially as described.

4. The combination with a draw-head having a vertical slot, of a horizontally-swinging hook arranged to engage the link, means for normally holding the hook in retracted position, a sliding dog arranged to swing the hook, and a recess into which the dog drops when in its rear position; substantially as described.

5. The combination with a draw-head having a vertical slot, of a pusher having a front end provided with an open vertically extending recess to removably receive a link, and a buffer-rod connected to the pusher; substantially as described.

6. The combination with a draw-head, having a vertical slot and a horizontal slot, of a horizontally-swinging hook arranged to engage a link when in the vertical slot, and a vertical pin to engage a link in the horizontal slot; substantially as described.

In testimony whereof I have hereunto set my hand.

JAMES HARPER.

Witnesses:
RICHARD BLACK,
ALEX. SPEER.